2 Sheets—Sheet 1.
J. W. HARRISON, insane,
S. J. HARRISON, Guardian.
J. W. HARRISON, assignor of two-thirds interest to J. J. HARRISON and O. BUTLER.
Coal Mining Machine.
No. 9,439. Reissued Nov. 2, 1880.
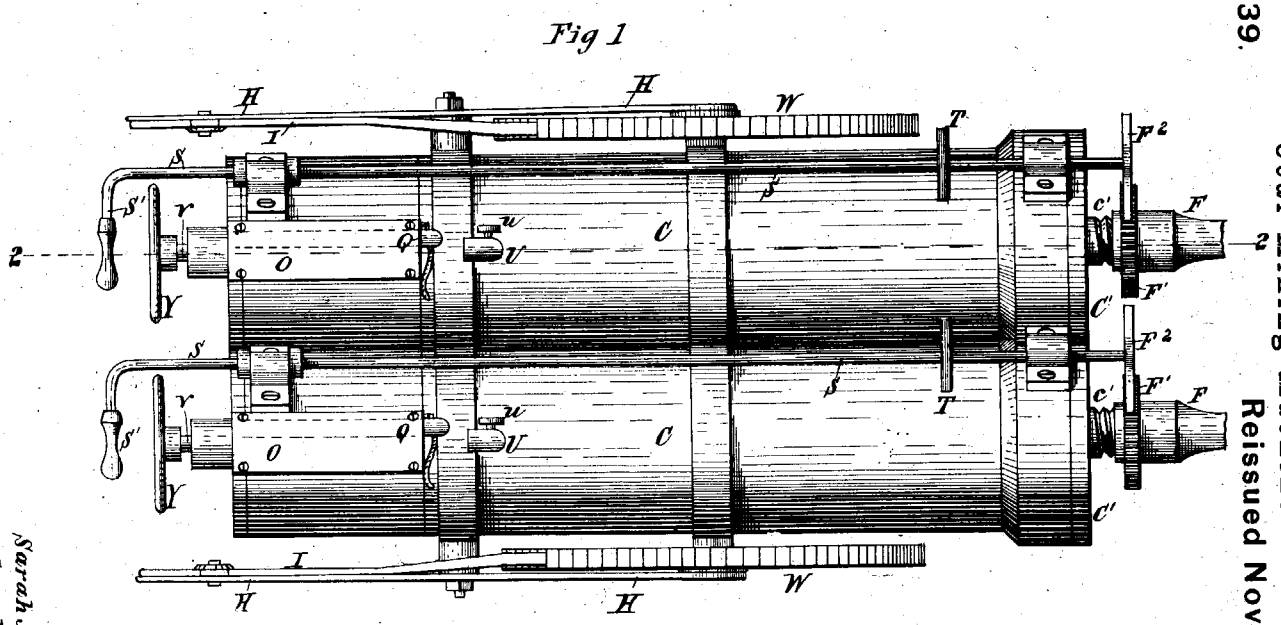
Witnesses
W. C. Collis
Jno. C. MacGregor
Sarah J. Harrison
Guardian of
Jonathan W. Harrison
Inventor
By Cobourn & Tracy
Attorneys 2 Sheets—Sheet 2.
J. W. HARRISON, insane,
S. J. HARRISON, Guardian.
J. W. HARRISON, assignor of two-thirds interest to J. J. HARRISON and O. BUTLER.
Coal Mining Machine.
No. 9,439. Reissued Nov. 2, 1880.
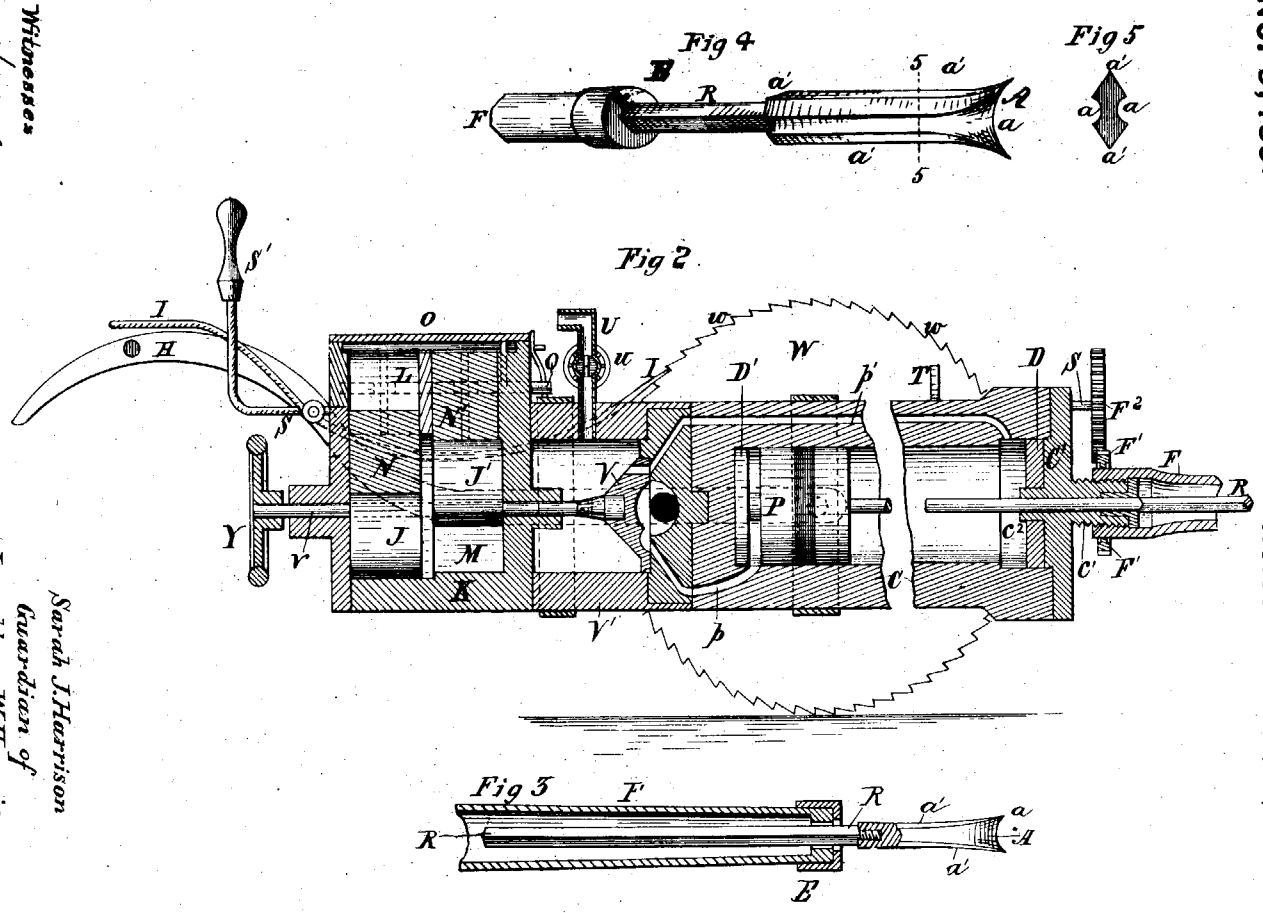
Witnesses
W. C. Corlies
Jno. C. MacGregor.
Sarah J. Harrison
Guardian of
Jonathan W. Harrison
Inventor
By Johnson & Thacher
Attorneys

UNITED STATES PATENT OFFICE.

SARAH J. HARRISON, OF JACKSON, MICHIGAN, GUARDIAN OF JONATHAN W. HARRISON, INSANE; SAID JONATHAN W. HARRISON ASSIGNOR OF TWO-THIRDS INTEREST TO JOHN J. HARRISON AND ORANGE BUTLER.

COAL-MINING MACHINE.

SPECIFICATION forming part of Reissued Letters Patent No. 9,439, dated November 2, 1880.

Original No. 219,090, dated September 2, 1879. Application for reissue filed October 1, 1880.

*To all whom it may concern:*

Be it known that JONATHAN W. HARRISON, of Wayne, in the county of Wayne and State of Michigan, did invent a new and Improved Coal-Mining Machine, of which the following is a specification.

The machine is constructed with a drill or pick of peculiar construction having a concave end and an octagonal body and concave faces, and receiving a longitudinal reciprocating motion by means of a piston working in a horizontal cylinder and driven by compressed air or steam, which is admitted to the ends of the cylinder alternately by means of either a rotary or reciprocating valve driven by a double rotary engine consisting of a pair of eccentrics coupled together, so as to stop and start at any point, and governed by two slide-valves held down by air or steam, as is usual with steam-engine valves. The motion of the machine is regulated by a throttle operated by a lever on the end of the valve-chest. A hand-wheel is mounted on the shaft of the coupled eccentrics for starting them. In each end of the cylinder is a rubber cushion, that in the forward end, through which the piston-rod carrying the pick works, being annular and fitting over a nose projecting inward from the cylinder-head, and screw-threaded to secure the rubber cushion, the front face of the piston being recessed to receive said nose. The inner portion of the piston-rod may be round, but the outer part is of square, octagon, or other non-circular shape, and works through a guiding-sleeve fitted to rotate on the front cylinder-head, and provided with a pinion to rotate it, by means of a cogged segment mounted on a rod extending back to the rear of the machine, and bent in the form of a hand-lever for the purpose of turning the drill or pick, so that its cutting-blade may be in either a vertical or horizontal plane, as required.

The cylinder is mounted on two wheels, being connected directly to their axle, so that the cylinder may be oscillated by the oscillation of the axle, and the center of oscillation is the same as the center of the revolution of the wheels. These wheels are formed with ratchet-teeth and held by pawls, so as to secure the machine against backward movement when working on an inclined surface. The machine is also provided with handles similar to those of a plow or hand-truck, by which it may be readily moved from place to place and pushed up to its work. It is made double, if preferred—that is, with two cylinders placed side by side and working their drills alternately.

In order that the invention may be more fully understood, it will be described with reference to the accompanying drawings, in which—

Figure 1 is a plan of the machine with the extremities omitted. Fig. 2 is a longitudinal section through the center of one of the cylinders on the line 2 2, Fig. 1. Fig. 3 is a longitudinal section of the projecting nose and pick stock and point, (omitted in Fig. 2.) Fig. 4 is a perspective view of the pick, with a portion of the guiding rod and sleeve; and Fig. 5 is a transverse section of the pick on the line 5 5.

C C are a pair of cylinders, mounted side by side on carrying-wheels W W, which are formed with ratchet-teeth *w w*, to enable the wheels to be locked against backward motion by means of lever-pawls I I, fulcrumed on the handles H H, by means of which the machine is advanced to its work as required.

A represents one of the improved pick-points, mounted on a square or other non-circular rod, R, attached to the piston P, one of which pistons works in each of the cylinders C C.

The cutting-face *a* of the pick is of concave shape, as shown, forming two prominent points. The upper and lower sides, *a' a'*, of the pick are formed with cutting-edges or sharp angles to adapt the tool to cut its way into the surface of the wall or top of the excavation in such a manner as to effectually prevent the deflection of the tool out of its proper line of cut by the contact of such surface, even after the projecting points of the cutting-face have become slightly worn.

The portion of the rod R outside or beyond the stuffing-box of the cylinder-head C' has the square section indicated in Figs. 2 and 3, or other non-circular shape, so that it may be guided in a box, E, of corresponding shape, formed to receive it in the extremity of the revolving tubular nose F.

A convenient mode of securing the nose F to the cylinder-head C′, and at the same time permitting its rotation, is shown in Fig. 2, the base of the nose being constructed with a female screw fitting a screw-threaded boss, $c'$, on the cylinder-head, and on the exterior of said tubular nose is secured a pinion, F′, deriving rotation from a segment-gear, $F^2$, mounted on a shaft, S, extending to the rear of the machine, and bent at right angles to form a hand-lever, S′.

On the shaft S is secured a stop, T, to limit its rotation, so that when turned as far as possible in one direction the double-pointed pick will work in a vertical plane, and when turned as far as possible in the other direction in a horizontal plane.

The piston P is cushioned at the extremities of its stroke by rubber disks D D′, the cushion D, through which the piston-rod must work, being annular and secured upon an inwardly-projecting boss, $c^2$, threaded to receive and hold it, the forward face of the piston being recessed to pass over said nose.

The steam or compressed air to work the piston P reaches the ends of the cylinder through ports $p$ $p'$ under control of either a rotary or a slide valve, V, worked by double eccentrics J J′, keyed to its shaft $v$, and working in a cylinder, K, and constituting a double rotary engine, which is driven by the same power which works the piston P.

The cylinder K is double, being divided by a partition, L, and rotary head M, to admit of mounting the eccentrics at an angle to each other, so as to avoid dead-centers.

N N′ are the sliding abutments bearing on the peripheries of the eccentrics J J′, as in rotary engines.

O O are the steam-chests of the valve-driving engine J J′ K, and Q Q throttles to control the admission of steam or air thereto.

U U are pipes admitting steam or air to the main valve-chests V′. $u$ $u$ are cocks or throttles controlling said pipes.

Y is a hand-wheel mounted on the end of the valve-shaft $v$ for starting the machine.

If it be preferred to use a slide-valve instead of the rotary valve V here represented, said slide-valve will be worked by a crank or eccentric on the shaft $v$ in customary manner.

The particular construction of drill or pick herein shown and described—that is to say, with a crescent-shaped double-pointed working extremity and octagon concave-faced body—gives it great strength and stiffness, and at the same time adapts it to work with freedom and good effect in deep holes.

In Letters Patent No. 198,610, granted the 25th of December, 1877, is described a pick constructed with a concave end and held in a certain plane by a guiding-nose.

It is found in practice that the pick therein described fails to operate with good success by reason of the faulty construction of its sides, the result being that the point or corner which was exposed to wear against the drifting-surface rapidly became rounded, and a converging cut was the unavoidable result, rendering the pick practically inoperative, because it would not cut in a straight line or plane.

By the present improvement the pick is formed with sharp edges, as illustrated in Figs. 3, 4, and 5, as well as with a sharp concave face. This improvement accomplishes with perfect success the object of running the cut in a direct horizontal or vertical plane, as may be desired, the sharp edge effectually preventing the deflection of the pick, even when the corner has become slightly worn.

By mounting the cylinder or cylinders on the axle the oscillation of the former—necessary to change the position of and to direct the drill—is very easily effected and the whole construction and arrangement of the machine simplified and made more compact and more easily managed. This construction thus presents a number of advantages over that in which a support truck-frame is employed, on which the cylinder is mounted.

Having thus described the invention, what is claimed as new, and the invention of the said JONATHAN W. HARRISON, is—

1. In a coal or rock drilling machine, a pair of supporting-wheels, in combination with the drill-cylinder mounted on the axle of said wheels, substantially as and for the purpose set forth.

2. In a coal or rock drilling machine, a pair of supporting-wheels, in combination with a drill-cylinder arranged to oscillate about a center coincident with the center of revolution of the supporting-wheels, substantially as and for the purpose set forth.

3. The supporting and carrying wheels W in combination with the drill cylinder or cylinders C, attached directly to the axle of the carrying-wheels, substantially as described.

4. The carrying-wheels W, provided with ratchet-teeth, in combination with the drill cylinder or cylinders C, attached directly to the axle of the carrying-wheels, and locking-pawls arranged to engage with the ratchet-teeth on the wheels, substantially as described.

5. The combination, with a suitable pick, of the piston P, the cylinder C, the valve V, and the double-eccentric engine E E′, for operating the said valve.

6. The combination of the piston P, recessed as described, the cylinder-head C′, provided with inwardly-projecting nose $c^2$, and the cushion D, secured on said internal nose, as explained.

7. The combination, with the pick A, of the non-circular rod R, the revolving guide-sleeve E, gearing F, and shaft S, as and for the purposes set forth.

8. The combination, in a coal or rock drilling machine, of the toothed carrying-wheels W, the holding-pawls, and the handles H, substantially as and for the purposes set forth.

9. The pick A, constructed with a concave cutting-face, *a*, and with cutting-edges *a′ a′* at its upper and lower sides, in combination with the guiding-rod R and box or sleeve E, substantially as and for the purposes set forth.

SARAH J. HARRISON,
*Guardian of Jonathan W. Harrison.*

Witnesses:
JAS. R. HOSIE,
JNO. J. MARKER.